Figure 1:
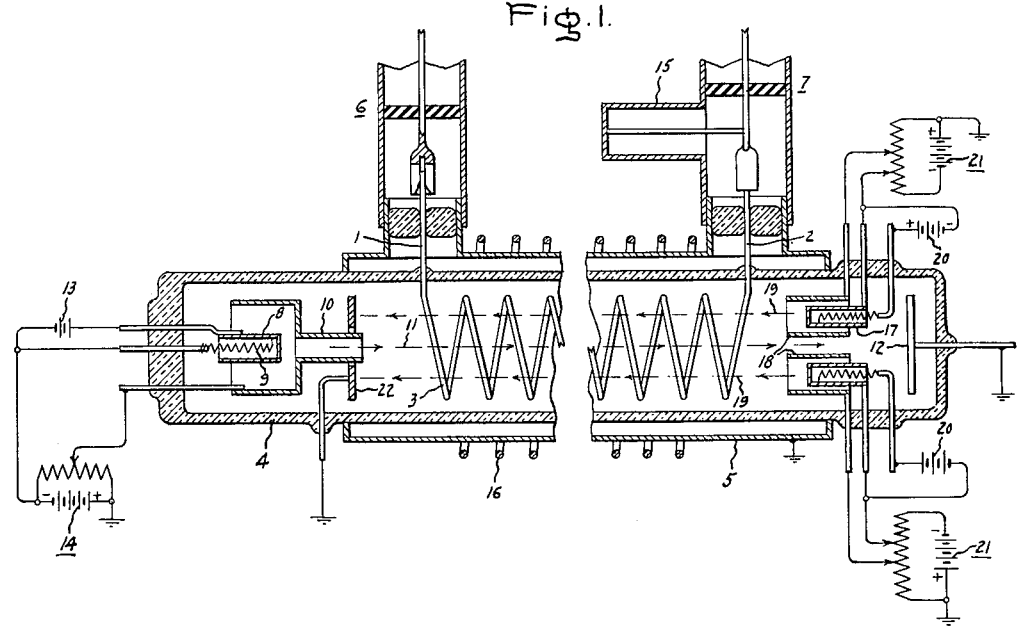

313-414.  XR  2,735,033  SR

TX6295

Feb. 14, 1956     S. E. WEBBER     2,735,033
TRAVELING WAVE TUBE
Filed June 18, 1952

Inventor:
Stanley E. Webber,
by Paul A. Frank
His Attorney.

United States Patent Office 2,735,033
Patented Feb. 14, 1956

2,735,033

TRAVELING WAVE TUBE

Stanley E. Webber, Schenectady, N. Y., assignor to General Electric Company, a corporation of New York Application June 18, 1952, Serial No. 294,173

12 Claims. (Cl. 315—3.5)

My invention relates to improvements in electron discharge devices of the type generally known as traveling wave tubes.

In traveling wave tubes, energy is exchanged between an electron stream and a propagated wave, the average velocity of the electron stream usually being somewhat greater than that of the propagated wave in order to transfer energy thereto. The structure which transmits the traveling wave is usually a helical conductor so that the velocity of the wave along the axis of the helix may be substantially less than the actual velocity along the helix conductor, and in the vicinity of conveniently obtainable electron beam velocities. While such traveling wave amplifiers are characterized by their broad band application, the difficulty of terminating such a structure for a wide band of frequencies results in a substantial reflected component which, upon re-reflection, may cause oscillation. To prevent such oscillation, various means for attenuating the backward traveling wave have been employed, such means usually comprising a conductive or semi-conductive means positioned along the traveling wave path to absorb some of the wave energy. However, such devices tend to reduce the gain, efficiency, and power output of the traveling wave tubes due to their interaction with the forward traveling wave.

It is an object of my invention to provide a traveling wave tube having an improved means for stabilizing its operation.

It is a further object of my invention to provide means for attenuating the backward traveling wave of a traveling wave tube which does not interact with the forward traveling wave.

It is another object of my invention to provide a traveling wave tube having increased power output, gain, and efficiency.

According to one aspect of my invention, the backward-traveling reflected wave of a traveling wave tube is attenuated by one or more backward-traveling electron beams. The velocity of the attenuating beam is adjusted so that energy transfer between the reverse beam and the reflected wave is in the opposite direction than that usefully employed for amplification of the forward traveling wave by the forward electron beam. Since the velocity of the backward beam differs so greatly from the velocity of the forward propagated wave, there is very little interaction between them, and, accordingly, the desired attenuation of the backward traveling wave is obtained without affecting the amplication of the forward traveling wave.

The features which I desire to protect herein are pointed out with particularity in the appended claims. The invention itself, together with further objects and advantages thereof, may best be understood by reference to the following description taken in connection with the drawings, in which Fig. 1 represents a schematic longitudinal section of a traveling wave tube embodying principles of my invention and Fig. 2 is a sectional view of a traveling wave tube embodying a modification of my invention.

Figure 2:
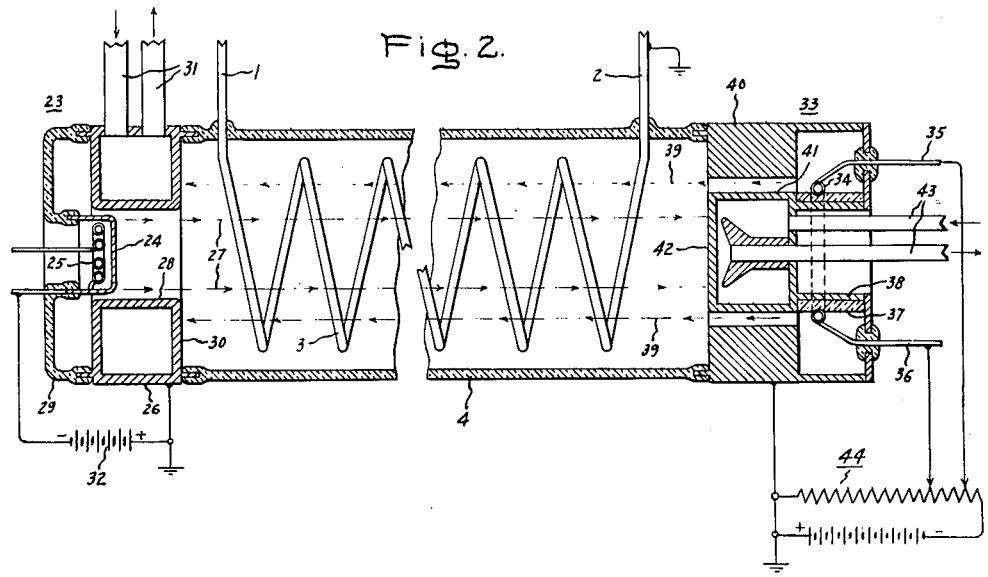

Referring now to Fig. 1, the traveling wave tube amplifies an electromagnetic wave propagated between input terminal 1 and output terminal 2. Connecting these terminals is a structure which transmits electromagnetic waves at a relatively low velocity commensurate with the velocity range conventionally obtainable for electron beams. This structure may be an electrically conductive wire helix 3 as shown in the drawing. Since an electromagnetic wave travels along the wire of helix 3 at substantially the speed of light, the velocity of the wave along the axial direction of the helix is less than the speed of light and varies according to the ratio between the pitch of helix 3 and its diameter. It is known in the art that other structures which transmit electromagnetic waves at relatively low velocity may be used in place of the helix, and it will be understood that such other structures may be used in the practice of my invention. Examples of structures which have been proposed for such use are a rod which is electrically loaded with a plurality of closely spaced transverse metal disks, or a cylindrical waveguide loaded with a plurality of apertured disks.

Closely surrounding and enclosing the helix 3 is a tubular envelope 4 made of a suitable non-magnetic material, such as glass. This envelope is evacuated in the customary manner. To prevent dispersion of the propagated wave, suitable shielding means, which may take the form of a non-magnetic metallic cylindrical sleeve 5 surrounding the length of the envelope 3 containing the helix, is preferably employed. If desired, the shield 5 may itself comprise part of the evacuated envelope, in which case the helix is suitably insulated for high frequencies from the shield. The shield is apertured at the input and output terminals 1 and 2, such an arrangement being especially adapted for concentric line coupling to external circuits. As shown in Fig. 1, an input concentric conductor transmission line section 6 may be utilized with the outer conductor thereof connected to the shield 5 and the inner conductor connected to the terminal 1. An output transmission line section 7 is similarly arranged with its inner conductor contacting the output terminal 2. Various means of coupling the traveling wave helix to external circuits are well known in the art and may be substituted as desired.

Within the input end of the envelope 4 (the left-hand end as oriented in Fig. 1) is an electron gun comprising a cathode 8, a cathode heater 9, and a focusing or control electrode 10. The electrode 10 is preferably tubular in shape and coaxial with the helix 3, so that a beam of electrons, indicated by dotted lines 11, is directed axially through the helix to a collector plate 12 positioned within the output (right-hand) end of the envelope 4. The diameter of the beam indicated by dotted lines 11 is substantially smaller than the internal diameter of the helix for reasons explained in the following paragraphs, and the internal diameter of the focusing electrode 10 is accordingly restricted. A source of heater voltage 13, conventionally indicated as a battery, is connected to the heater terminals to maintain the emitting surface of the cathode at a sufficiently high temperature for providing a high density electron beam.

A source of unidirectional voltage 14, conventionally represented as a battery having a resistor connected across its terminals, is connected to maintain the cathode at a large negative potential with respect to ground. The collector electrode accordingly is conveniently placed at a positive potential with respect to the cathode by also connecting it to ground. The collector electrode does not in itself substantially affect the electron beam velocity, and for this reason the helix 3 and shield 5 are both grounded to provide an accelerating potential between the end of the helix facing the electron gun and to maintain a field-free region within the helix. The beam velocity is accordingly established upon entrance of the beam into the helix, further changes being due only to interaction with the traveling wave.

One suitable means of grounding the helix and shield for direct current without interfering with the propagation of the traveling wave is by employing a quarter-wave shorting stub on the concentric conductor output coupling line 7. Such a stub is one-fourth wavelength long at the central frequency of the band of operating frequencies and has its inner and outer conductors respectively coupled at one end to the inner and outer conductors of the coupling section 7 and short-circuited together at the other end. The shield 5 is then connected to ground.

While the velocity of the electrons entering the helix is established by the full voltage of the source 14, the magnitute of the beam current is separately controlled by the electrode 10, which is connected to an intermediate tap on the resistor of the voltage source 14, various other beam forming means known to those skilled in the art may be substituted as desired.

Focusing of the beam throughout its travel along the helix axis is further maintained by a static magnetic field directed along the helix axis. A solenoid 16 for producing such a field surrounds the shield 5 along its length in order to maintain a substantially constant axial field component. To simplify the drawing, the connection of the solenoid terminals to a unidirectional current source is not shown.

In accordance with the conventional practice in the traveling wave tube art, the ratio of pitch to diameter of the helix 3 and the electron accelerating potential provided by the battery 14 are so related that the forward electron beam 11 travels in the same direction as the forward electromagnetic waves propagated along the helix from the input terminal 1 to the output terminal 2 with a velocity relationship such that energy is transferred from the beam to the wave. As is known in the art, the adjustment is commonly such that the velocity of the beam is somewhat greater than that of at least one component of the electromagnetic wave. Under these conditions, it is known that interaction between the beam and the wave occurs to amplify the electromagnetic wave as it travels along the helix. One explanation of this interaction by J. R. Pierce may be found in the Bell System Technical Journal, vol. 29, No. 1 (January 1950), pages 6 to 19. The energy exchange is available at several beam velocities, and the velocity chosen depends upon a number of factors, including the magnitude of the beam current.

In accordance with my invention, oscillation of the amplifier described due to reflection of waves from the output end of the helix which then travel in a backward direction and are subsequently re-reflected is prevented by a second or backward traveling beam or beams. As is shown in Fig. 1, two additional electron guns each having a cathode 17, and a focusing and control electrode 18 are positioned in the output end of the envelope in front of the collector electrode 12. Each of these electron guns is designed to produce a small diameter beam 19 reversely directed along an axis within the helix parallel to the helix axis, but spaced from the forward beam 11. The reverse beam guns can also be alternatively located outside the helix to direct the beams along an axis parallel to the helix axis, and adjacent the outer helix envelope.

The reversely directed electron guns 16 are suitably conventional in design. Each cathode 17 has a heater connected to a separate external source of heater voltage conventionally represented as a battery 20. The cathode 17 and control electrodes 18 of the respective reversely directed guns are also preferably connected to separate voltage sources 21 for separate velocity and current adjustments of the two beams 19. The voltage sources 21 may each suitably take the form of a battery shunted by a voltage dividing resistor, the positive terminal of each battery being grounded. Each cathode 17 is connected to a tap on its voltage source 21, the voltage from the tap to ground establishing the velocity of the beam entering the helix 3. Likewise, each control electrode 18 is connected to another tap on its voltage source 21 to control the beam current.

To collect the current of the beams 19, a common collector electrode 22 for the two reversely directed beams 19 is connected to ground. This electrode, which may suitably take the shape of an annular washer, is positioned around the tubular accelerating electrode 10 for the forward beam 11. If desired, the reverse beam electrode collector 22 may be eliminated and the outer surface of the accelerating electrode 10 employed to collect the electrons from the reverse beams.

Since the traveling wave tube is capable of amplifying a very broad band of frequencies, the impedance of the load connected to the output coupling circuits 7 is not readily matched to the impedance of the helix at all frequencies which the tube can amplify. Accordingly, at certain frequencies reflected waves from the output end of the helix 3 may travel in a reverse direction along the helix to the input end where the reflected waves are again reflected and further amplified, thus tending to produce oscillations. However, when the reversely directed electron beams 19 are directed along the helix at an appropriate velocity, energy is transferred from the backwardly traveling reflected waves to the reverse beams 19.

A favorable condition for such an energy exchange is to adjust the velocity of the reverse beams by adjusting the voltage supplied to the cathodes 17 of the reverse beam guns so that the beam velocity is somewhat less than the velocity of the reflected waves. The propagated wave in a traveling wave tube is generally analyzed as having three component waves, one of which in a conventional traveling wave amplifier is substantially increased in amplitude to provide the useful amplification. It is this useful component whose amplitude is so large that its reflected wave must be attenuated, and accordingly the velocity of the reversely directed beams 19 must be chosen with respect to the initial velocity of this component upon reflection from the output end of the tube.

While there is some tendency for the propagated wave in a traveling wave tube to change in velocity as its frequency changes, such dispersion is undesirable in the reflected wave inasmuch as the attenuation is dependent upon the velocity relationships between the reflected wave of the reversely directed beam. Accordingly, the helix 3 is designed according to principles well known in the art for relatively low dispersion and, in addition, the outer metallic shield 5 is preferably relatively close to the helix.

In order that the attenuation bandwidth be sufficiently broad so that all reflected frequency components are attenuated, the velocities of the reverse beams 19 are preferably differently adjusted so the beams have overlapping attenuation bandwidths. This is readily provided by the different beam voltages obtainable from each voltage source 21. Of course, only one reverse beam need be employed, if desired, or an additional number of reverse beams may also be employed, preferably at different velocities, in order to increase the attenuation bandwidth and thus assure stabilization of the amplifier. It is to be noted that while the backward and forward beams must be adequately positioned and focused to prevent interference with each other, the backward beam does not materially interact with the forward traveling wave due to the very large velocity difference between them.

Referring now to Fig. 2, another embodiment of my invention is illustrated, in which the hollow reverse beam is concentric with the forward beam. Apart from the beam forming and collecting means the structure corresponds to that of Fig. 1, in which traveling wave input and output terminals 1 and 2 respectively are connected by a helix 3, the helix being enclosed in an envelope 4 suitably made of glass. For purposes of simplifying the drawing, the metallic shield 5, the input and output coupling means 6 and 7, and the solenoid 15 are not illustrated. While the output terminal 2 is also shown directly connected to ground, the actual ground circuit connection is preferably made as in the structure of Fig. 1.

As shown in Fig. 2, a beam forming and collecting means 23 is sealed to the left hand of the tubular envelope 4 as the input end of the tube to form one end of the envelope. Included is a cathode 24, comprising a cup-shaped metallic member whose outer end surface is suitably coated with a thermionic emitting material, such as barium oxide. Within the cathode is a heater 25 having one connected to the cathode. A hollow annular conductive member 26 surrounds a portion of the path of electrons which are emitted from the cathode 24 and accelerated as a forward beam 27 along the helix axis. The inner cylindrical surface 28 of the annular member 26 serves as the beam focusing and accelerating electrode, and its diameter is sufficiently constricted so that the beam diameter is approximately half the internal diameter of the helix, thus leaving space between the beam and the helix for the reverse attenuating beam. The annular hollow electrode 26 has one end surface thereof sealed to the end of the tubular glass envelope 4 and the opposing end surface sealed through an annular glass sealing member 29 to the cathode cup 24, thus completing the envelope at that end of the device.

The annular surface 30 of the electrode 26 facing the helix also serves as the collecting surface for a reversely directed beam. In order to remove the heat resulting from the collecting of the reverse beam upon the surface 30, a fluid coolant, such as water, is circulated within the hollow member 26. Input and output coolant tubing connections 31 are provided for this purpose.

A source of unidirectional voltage 32, conventionally represented as a battery, is connected between the cathode 24 and the combined accelerating and collecting electrode 26 to place the electrode at a suitable positive voltage with respect to the cathode. The electrode 26 may suitably be grounded. In this case, the electrode surface 28 acts principally as a focusing and accelerating electrode for establishing the forward beam velocity. Beam current control arrangements such as shown in the embodiment of Fig. 1 may also be used if desired.

At the other end of the traveling wave tube of Fig. 2, a second beam forming and collecting means 33 is shown. The cathode 34 thereof may suitably take the form of a relatively close wound helix arranged in a circular form with connection terminals 36 and 35 connected at diametrically opposite points thereon to provide two parallel paths for the cathode current. The wire size and cathode resistance are preferably chosen to provide a relatively high voltage drop across the cathode terminals, and a suitable thermionic emitting material is applied to the wire surface to provide heavy electron emission. The circular cathode is positioned to be concentric with the axis of the helix 3 and is suitably insulatingly supported by an insulating ring 37 from a conductive cathode supporting cylinder 38. The diameter of the circular cathode circle 34 is intermediate the diameter of the forward traveling beam and the inner diameter of the helix 3 in order that the hollow reverse beam 39 may surround the forward beam without striking the helix 3.

The reverse beam 39 is focused and accelerated between the opposing surfaces of a pair of concentric cylinders 40 and 41 which are suitably spaced from each other to provide a desired beam thickness. The outer cylinder 40 has one end surface thereof supportingly sealed to the right-hand end of the glass envelope tubing 4 and has the other end surface hermetically secured to the cathode support 38. The hollow inner cylinder 41 is also hermetically secured to the cathode support 38 and supported thereby, thus completing the device envelope. The concentric cylinders are also thus conductively connected for application of direct current potentials thereto. The end surface 42 of the cylinder 41 facing the helix also serves as the collecting electrode for the forward beam 27. This surface is cooled by circulation of a coolant such as water through the hollow cylinder 41. Input and output coolant tubing connections 43 are shown for that purpose.

The beam forming and collecting structure 33 is grounded and placed at a positive potential with respect to the cathode through a voltage source 44 represented as a voltage dividing resistor connected across a battery having the positive terminal grounded. The cathode terminals 35 and 36 are connected to taps on the voltage divider to place the cathode at the desired negative potential with respect to ground to establish the desired beam velocity range. Since the cathode voltage itself is preferably large so as to be a material portion of the accelerating voltage, the accelerating potential differs with respect to different parts of the cathode to thereby provide a different velocity for the different parts of each half circumference of the hollow reverse beam 39. The average velocity and the velocity range of different sections of the reverse beam is thus selected. At the same time, the collecting surface 42 is connected by the ground return path to the forward beam voltage source 32 for collection of the forward beam electrons.

As discussed in connection with the traveling wave tube illustrated in Fig. 1, the reverse electron beam is adjusted in velocity so that it gains energy from the reflected waves along the helix 3. Similarly, as previously discussed, the range of velocities of different parts of the beam provide the same general effect as having a number of beams of different velocities whereby the attentuating bandwidth can be increased to assure adequate stabilization. Of course, if desired, other electron gun structures than that specifically illustrated may be employed to establish a velocity range for different sections of the beam or additionally provide independent beam current control. If desired, a single velocity beam may be employed providing the attenuation bandwidth of the reflected wave is sufficient for the application involved.

While I have shown particular embodiments of the invention, it will be understood that numerous modifications may be made by those skilled in the art without actually departing from the invention. I therefore aim in the appended claims to cover all such equivalent variations as come within the true spirit and scope of the foregoing disclosure.

What I claim as new and desire to secure by Letters Patent of the United States is:

1. In a traveling wave tube of the type having a transmission structure for transmitting an electromagnetic wave at a velocity less than the velocity of light and means for providing an electron beam in proximity to said structure and having a proper relative velocity with respect to said wave to amplify the wave, means for providing a second electron beam in proximity to said structure having a proper relative velocity with respect to a reflected wave to attenuate the reflected wave.

2. In a traveling wave tube of the type having a transmission structure for transmitting an electromagnetic wave in a forward direction along said structure at a velocity less than the velocity of light and having means for providing an electron beam in proximity to said structure and traveling in said forward direction at a relative velocity with respect to said forward wave velocity whereby the interaction therebetween occurs to amplify the wave, means for attenuating a reflected wave transmitted in the reverse direction along said structure comprising means for providing another electron beam in proximity to said structure traveling in said reverse direction at a relative velocity with respect to said reflected wave velocity whereby interaction occurs therebetween to attenuate said reflected wave.

3. In a traveling wave tube of a type having a transmission structure along which electromagnetic waves to be amplified are transmitted in a given direction at a low velocity and having means for providing an electron beam in proximity to said structure and at a relative velocity with respect to said waves whereby interaction therebetween occurs to amplify the waves, means for attenuating reflected waves traveling along said structure in the opposite direction from said amplified waves comprising means for providing a second electron beam in proximity to said structure traveling at a relative velocity wtih respect to said reflected waves whereby interaction therebetween occurs to attenuate the reflected waves.

4. In a traveling wave tube of the type having a transmission structure for transmitting electromagnetic waves of a range of frequencies in a forward direction along the structure at a velocity less than the velocity of light and having means for providing an electron beam in proximity to said structure and traveling in said forward direction at a relative velocity with respect to said forward wave velocity whereby interaction therebetween occurs to amplify the waves, means for attenuating reflected waves of said range of frequencies transmitted in a reverse direction along said structure comprising means for providing electron beam components in proximity to said structure traveling in said reverse direction at different velocities with respect to said reflected wave velocity whereby interaction occurs therebetween to attenuate said reflected wave.

5. In a traveling wave tube of a type having a transmission structure along which electromagnetic waves of a given band of frequencies to be amplified are transmitted at a velocity less than the velocity of light and having means for providing an electron beam in proximity to said structure and at a relative velocity with respect to said waves whereby interaction therebetween occurs to amplify the waves of said band of frequencies, means for attenuating reflected waves of at least as wide a band of frequencies traveling along said structure in the opposite direction from said amplified waves comprising means for producing a plurality of electron beams in proximity to said structure traveling in said opposite direction at different relative velocities with respect to said reflected waves whereby interaction therebetween occurs to attenuate the reflected waves.

6. An electron discharge device comprising a transmission structure having input and output terminals between which electromagnetic waves are transmitted in a given direction at a low velocity, means to provide a first electron beam in proximity to said structure traveling in the same direction as an electromagnetic wave so transmitted, the velocity of said first beam with respect to the velocity of said wave being selected so that interaction therebetween occurs to amplify the wave, means to provide a second electron beam in proximity to said structure traveling in the same direction as a reflected wave transmitted in the opposite direction from said given direction, the velocity of said second beam with respect to the velocity of said reflected wave being selected so that interaction therebetween occurs to attenuate the reflected wave.

7. A traveling wave tube comprising input and output terminals, a long electrically conductive helix extending along an axis between said terminals for transmitting electromagnetic waves therebetween at low velocity, a metallic shield surrounding said helix to prevent dispersion of waves transmitted along said helix to prevent change in axial velocity of waves so transmitted with wave frequency, means for providing a first electron beam axially through said helix in the direction of waves so transmitted at a relative velocity with respect to said waves whereby interaction therebetween occurs to amplify said waves, said means comprising an electron gun near the input terminal, and means for attenuating reflected waves traveling in the opposite direction comprising an electron gun near the output terminal for producing a second electron beam axially through said helix in the reverse direction at a relative velocity with respect to said reflected waves whereby interaction therebetween occurs to attenuate said reflected waves.

8. A traveling wave tube comprising input and output terminals, a long electrically conductive helix extending along an axis between said terminals for transmitting electromagnetic waves therebetween at low velocity, means for providing a first electron beam axially through said helix in the direction of waves so transmitted at a relative velocity with respect to said waves whereby interaction therebetween occurs to amplify said waves, said means comprising an electron gun near the input terminal, and means for attenuating reflected waves traveling in the opposite direction comprising a plurality of electron guns near an output terminal for producing a plurality of additional electron beams axially through said helix in the reverse direction at a relative velocity with respect to said reflected waves whereby interaction therebetween occurs to attenuate said reflected waves.

9. A traveling wave tube comprising input and output terminals, a long electrically conductive helix extending along an axis between said terminals for transmitting electromagnetic waves therebetween at low velocity, means for providing a first electron beam axially through said helix in the direction of waves so transmitted, said means comprising an electron gun near the input terminal, and means for attenuating reflected waves traveling in the opposite direction comprising a pluality of electron guns near an output terminal for producing a plurality of additional electron beams axially through said helix in the reverse direction, said additional electron beams having different velocities.

10. A traveling wave tube comprising input and output terminals, a long electrically conductive helix extending along an axis between said terminals for transmitting electromagnetic waves therebetween at low velocity, means for providing a first electron beam axially through said helix in the direction of waves so transmitted, said means comprising an electron gun near the input terminal, and means for attenuating reflected waves traveling in the opposite direction comprising an electron gun near the output terminal for producing a second electron beam concentric with said first beam in the reverse direction.

11. A traveling wave tube comprising input and output terminals, a long electrically conductive helix extending along an axis between said terminals for transmitting electromagnetic waves therebetween at low velocity, means for providing a first electron beam axially through said helix in the direction of waves so transmitted, said means comprising an electron gun near the input terminal, and means for attenuating reflected waves traveling in the opposite direction comprising an electron gun near the output terminal for producing a second electron beam concentric with said first beam in the reverse direction having axial sections with different velocities.

12. In a traveling wave tube of a type having a helical conductor along the axis of which electromagnetic waves of a given band of frequencies to be amplified are transmitted at a velocity less than the velocity of light and having means for providing a first electron beam directed along said axis and at a relative velocity with respect to said waves whereby interaction therebetween occurs to amplify the waves of said band of frequencies, means for attenuating reflected waves of at least as wide a band of frequencies traveling along said structure in the opposite direction from said amplified waves comprising means for producing a hollow electron beam coaxial with said first beam in proximity to said conductor traveling in said opposite direction with different axial sections at different relative velocities with respect to said reflected waves whereby interaction therebetween occurs to attenuate the reflected waves.

References Cited in the file of this patent

UNITED STATES PATENTS 2,578,434   Lindenblad _____ Dec. 11, 1951

FOREIGN PATENTS 993,102   France _____ July 18, 1951